United States Patent [19]
Saito et al.

[11] Patent Number: 5,710,616
[45] Date of Patent: Jan. 20, 1998

[54] FILM POSITION DETECTING DEVICE, FILM IMAGE DISPLAY DEVICE AND MOVIE FILM RECORDING DEVICE

[75] Inventors: Etsuro Saito; Kiyoshi Inatome, both of Kanagawa, Japan

[73] Assignee: Sony Corportion, Tokyo, Japan

[21] Appl. No.: 736,604

[22] Filed: Oct. 25, 1996

[30] Foreign Application Priority Data

Oct. 31, 1995 [JP] Japan ................................ 7-308384

[51] Int. Cl.$^6$ ................................................ G03B 21/50
[52] U.S. Cl. .............................. 352/92; 352/120; 352/160
[58] Field of Search ........................... 352/92, 120, 105, 352/119, 160

[56] References Cited

U.S. PATENT DOCUMENTS

| | | |
|---|---|---|
| 2,868,066 | 11/1959 | Argyle ................................. 352/120 |
| 3,544,207 | 12/1970 | John, Jr. ............................... 352/92 |
| 3,622,235 | 11/1971 | Yamada ................................ 352/92 |
| 3,753,612 | 8/1973 | Okey et al. ........................... 352/92 |

*Primary Examiner*—Russell E. Adams
*Attorney, Agent, or Firm*—William S. Frommer; Alvin Sinderbrand

[57] ABSTRACT

In a first guide unit the plural number of electrodes are provided facing the edge of a movie film containing a plurality of perforations formed along the longitudinal direction of the movie film, in a second guide unit a band shaped conducting material is provided facing the electrodes having the movie film between, and each stop position with respect to window holes is detected based on the amount of change of each electrostatic capacity changing depending on the displacement rate from each stop position of a plurality of condensers which are formed making each electrode and conducting material as a pole plate respectively and making the thickness of the movie film as the distance of pole plates. Therefore, a film position detection device, a film image display device and a movie film recording device capable of further improving the movie film position detection accuracy can be realized with the simple construction.

13 Claims, 12 Drawing Sheets

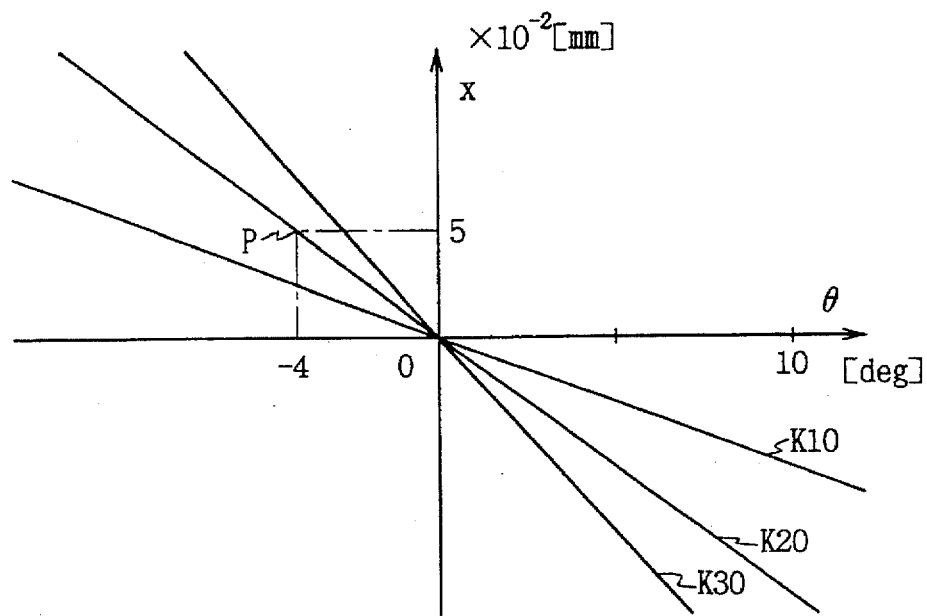
FIG. 12
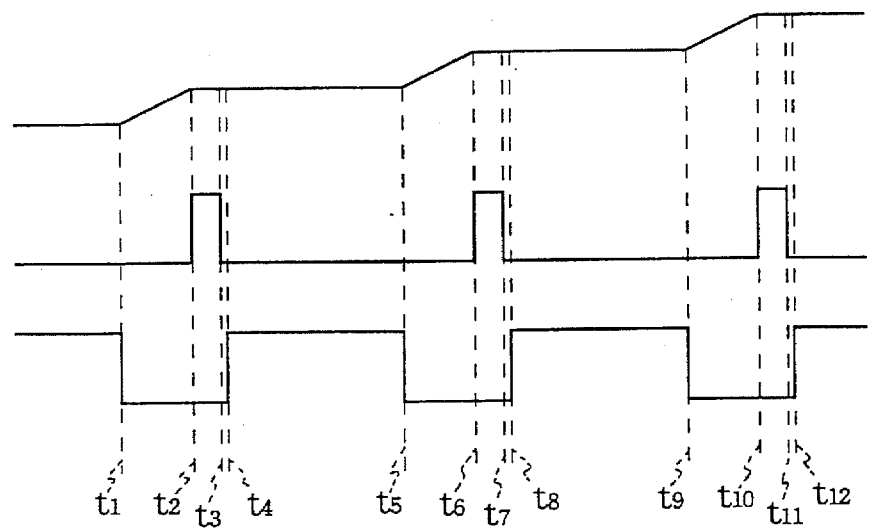
FIG. 13A
FIG. 13B
FIG. 13C

FILM POSITION DETECTING DEVICE, FILM IMAGE DISPLAY DEVICE AND MOVIE FILM RECORDING DEVICE

BACKGROUND OF THE INVENTION

1. Field of the Invention

This invention relates to a film position detecting device, a film image display device and a movie film recording device, and more particularly, is suitably applied to the film position detecting device to detect the position displacement of the movie film, the film image display device and the movie film recording device.

2. Description of the Prior Art

Conventionally, in a 35 mm movie film 1 being used in the movie theater as shown in FIG. 1, a row of perforations 2 for synchronizing (hereinafter referred to as perforations) are provided successively in the transverse direction on both edges of the movie film 1 at the fixed intervals (e.g., one frame is 19.05 mm and four perforations per one frame), and audio information formed of image and analog signals are optically recorded on the corresponding recording areas 4 and 5 respectively on the inside part between these two rows of perforations (hereinafter referred to as the first and the second row of perforations) 3A and 3B.

An example of carrying the movie film 1 by using the movie film running device shown in FIG. 2 will hereinafter be described.

In FIG. 2, 10 generally shows a movie film running device which is adapted to roll the movie film 1 pulled out from a feeding reel 11 round a take-up reel 14 through an image reproduction unit 12 and an analog audio reproduction unit 13.

In the image reproduction unit 12, the movie film 1 to be supplied from a feeding reel 11 through rollers 15 and 16 is received at an intermittent forwarding unit 20 via between a sprocket 17 and a sprocket shoe 18 and through a gate unit 19 and is sent out to an analog audio reproduction unit 13 from the intermittent forwarding unit 20 through a sprocket 21.

Here, the gate unit 19 is so constructed that the movie film 1 is held between a picture gate 22 and a pressure plate 23, and as well as a steel band 24 is provided on the face of the picture gate 22 facing the movie film 1, a guide shoe 25 having curved face is provided on the plane of the pressure plate 23 facing the movie film 1.

Furthermore, the intermittent forwarding unit 20 is so constructed that a sprocket for intermittent forwarding (hereinafter referred to as intermittent forwarding sprocket) 26 and a sprocket-shoe for intermittent forwarding (hereinafter referred to as an intermittent forwarding sprocket-shoe) 27 hold the movie film 1 between. In this case, in the intermittent forwarding unit 20, at the time of reproduction mode, this intermittent sprocket 26 successively rotates at the fixed timing by the fixed angle and thus, intermittently forwards the movie film 1 so that each image recording area 4 (FIG. 1) successively stops momentarily (e.g., 24 times/sec) in the gate unit 19.

At this point, the gate unit 19 holds both edges of the transverse direction of the movie film 1 between the steel band 24 and the guide shoe 25 during the movie film 1 is in operation.

Furthermore, at this point, a lamp house unit 28 is arranged on the left side of the picture gate 22 in the image reproduction unit 12. Optical beam for projection (hereinafter referred to as projection optical beam) L1 is projected from a light source 29 in the lamp house unit 28, and the optical beam is injected to the movie film 1 through a projection shutter 30 and a picture aperture (not shown in figure) arranged on the plane of the picture gate 22 facing the movie film 1. The projection shutter 30 provided in the lamp house 28 repeats opening and closing operations linking to the intermittent forwarding operation of the movie film 1 based on the drive control of a motor 31 and opens only when the movie film 1 is in the stop condition.

Moreover, in the image reproduction unit 12, the projection light beam L1 transmitted through each image recording area 4 of the movie film 1 is adapted to irradiate on a screen 33 through the picture aperture placed on the plane of the pressure plate 23 facing the movie film 1 (not shown in figure) and a projection lens 32 and thus images are projected on the screen 33.

Then, the movie film 1 sent out from the intermittent forwarding unit 20 connects with a drum 36 of the reproduction unit 35 through a sprocket 21 and a roller 34 of an analog audio reproduction unit 13. In this case the drum 36 is adapted to contact to one plane side of the movie film 1 avoiding the analog audio recording area 5 (FIG. 1) in which analog audio information of the movie film 1 is optically recorded with an exposure range according to its amplitude.

At the reproduction unit 35, an optical beam emitted from the light source not shown in figure is irradiated to the analog audio recording area 5 of the movie film 1 through the mirror and its transmission light is received by the photoelectric converting element. The photoelectric converting element forwards the light receiving signal with the signal level corresponding to the quantity of light of transmission light received to the following electric circuit, and the electric circuit reproduces analog audio information recorded on the analog audio recording area 5 of the movie film 1 based on the signal level of the signal received and outputs this to the following signal processing circuit or speaker, etc.

Then, in the movie film running device 10, the movie film 1 is supplied to a take-up reel 14 through a roller 37, a drum 38, a roller 39, sprockets 40 and 41 and a roller 42 in the analog audio reproduction unit 13, and thus the movie film 1 is rolled up round the take-up reel 14 successively.

In practice, in the gate unit 19 in the movie reproduction unit 12, since the outside area of each row of perforations 3A, 3B and the area between each perforation 2 in the transverse direction of the movie film 1 are pressed toward the steel band 24 by the guide shoe 25, the movie film 1 is so arranged that its position does not move in the longitudinal direction, i.e., running direction.

With this arrangement, in the case where the movie film 1 is intermittently forwarded by the intermittent forwarding sprocket 26, the position at which the movie film 1 momentarily stops followed by the rotating operation of the intermittent forwarding sprocket 26 in the gate unit 19 can be stabilized and as a result, images projected on the screen 33 can be prevented from image distortion.

In this connection, the faces of guide-shoe 25 and steel band 24, which contact to the movie film 1, are smoothly finished, and thus rows of first and second perforations 3A and 3B can be prevented from scratch marks due to the relative friction while the movie film 1 is running.

However, in the case of intermittently forwarding the movie film 1, it becomes difficult to hold the stop position of the movie film 1 on the stable condition in the gate unit 19 due to the relation with the surface condition of the movie film 1. Also, since there is the possibility that images projected on the screen 33 may be distorted in the case where the position of the movie film 1 moves in the transverse direction, guides (not shown in figure) which hold the movie film 1 from both sides in the transverse direction are provided in the gate unit 19 and thus the movie film 1 does not move in the transverse direction. However, there are cases where the position of the movie film 1 moves in the transverse direction due to the gap between the movie film 1 and the guides. And as a result, images projected on the screen 3 may be distorted.

As one of the methods to solve this problem, a photo sensor 7 is provided in the gate 19 as shown in FIG. 3, and by detecting the stop position of movie film 1 to be intermittently forwarded using the photo sensor 7, the projection position of the picture screen projected on the screen 33 is corrected depending on the detected result. The photo sensor 7 is approximately U-shaped, and at the stop position of the movie film 1 to the picture aperture of the gate unit 19, by holding a row of perforations 3B of the movie film 1 between, it can detect the displacement rate from the stop position (hereinafter referred to as the position displacement rate) corresponding to the position at one end in the longitudinal direction 2A and the other end in the transverse direction 2B of each perforation 2.

However, according to this method there is the possibility that dust sticks to the movie film 1 or shavings are produced on the movie film 1 due to the relative friction, and as a result, dusts sticking to the movie film 1 the optical path of the photo sensor 7 is intercepted and the stop position of the movie film 1 is erroneously detected.

Furthermore, in providing the photo sensor 7 in the gate unit 19, it is necessary to cut off a part of the guide shoe 25 and the steel band 24 and accordingly guide surfaces of the guide-shoe 25 and the steel band 24 facing to the movie film 1 become discontinuous at the parts cut off, and as a result, there is the possibility that scratch marks occur on the movie film 1.

Furthermore, since it is necessary to put the movie film 1 between the light projecting side and the light receiving side in the U-shaped photo sensor 7, the physical and mechanical restrictions arise at the time when inserting the movie film 1 and as a result, scratch marks might stick to the movie film 1.

In practice, while the picture gate 22 and the steel band 24 are fixed to the device, the pressure plate 23 and the guide shoe 25 are installed detachable. Thus, when replacing the movie film 1 mounted in the gate unit 19 with the other movie film 1, firstly the operator after transferring the pressure plate 23 connected to the picture gate 22 to the projection lens 32 side, removes the movie film 1 mounted. Then, the operator after inserting the other movie film 1 between the guide shoe 25 and the steel band 24 and by mounting the pressure plate 23 to the picture gate 22, mounts the movie film 1.

As described above, since the gate unit 19 is the part where the operator touches directly whenever he exchanges the movie film 1, the gate unit 19 is generally Very firmly constructed considering wear-resistance. Accordingly, it has been very difficult to provide the photo sensor 7 in the existing gate unit 19 judging from the construction of gate unit 19 which comprises the pressure plate 23 side and the picture gate 22 side as separate bodies.

Furthermore, since the operator mounts the photo sensor 7 having delicate construction to the gate unit 19 which he directly touches, it was a problem that the photo sensor 7 was easily broken.

SUMMARY OF THE INVENTION

In view of the foregoing, a first object of this invention is to provide a film position detecting device which are capable of improving the accuracy of the movie film position detection with the simple construction.

A second object of the invention is to provide a film image display device.

A third object of the invention is to provide a movie film recording device.

The first object and other objects of the invention have been achieved by the provision of a film position detecting device for detecting each stop position of the movie film in case of intermittently running the movie film. In the film position detecting device, on the first and the second guide units which hold the movie film from both sides between and on which window holes to transmit the light source light or the picture light to the fixed area of the picture film are formed, as well as multiple electrodes are provided facing the edge of the movie film containing a plurality of perforations along the longitudinal direction of the movie film in the first guide unit, the band-shaped conducting material is provided facing multiple electrodes having the movie film between in the second guide unit. Under this condition, after each stop position for these window holes is detected based on the amount of change of each electrostatic capacity changing according to the displacement rate from each stop position of multiple condensers formed making each electrode and conducting member as a pole plate respectively and making the thickness of the movie film as the distance of pole plates.

Moreover, the second object and other objects of the invention have been achieved by the provision of a film image display device for displaying the transmission light of picture film to the fixed projection object by stopping the movie film intermittently by connecting a film running device to a plurality of perforations formed along the longitudinal direction of the movie film and irradiating the light source light from the light source to the fixed area of the movie film at each stop position. In the film image display device, on the first and the second guide units which hold the movie film from both sides of the movie film and on which window holes for passing through light source light are formed, while multiple electrodes are provided facing the edge part of the movie film containing a plurality of perforations in the first guide unit, a band shaped conducting material facing multiple electrodes having the movie film between is provided in the second guide unit. Under this condition, each stop position with respect to window holes is detected based on the displacement rate of each electrostatic capacity changing corresponding to the displacement rate from each stop position of multiple condensers which are formed making each electrode and conducting material as a pole plate respectively and the thickness of the movie film as the distance of pole plates, and then the optical axis correcting means corrects the optical axis of transmission light depending on the detected result.

Furthermore, the third object and other objects of the invention have been achieved by the provision of a movie film recording device for stopping the movie film intermittently by connecting the running device to a plurality of perforations formed along the longitudinal direction of the movie film and for recording images based on the image light on the movie film by irradiating the fixed image light to the fixed area of the movie film at the each stop position. In the movie film recording device, regarding the first and the second guide units which hold the movie film between from both sides and on which window holes for transmitting image light are formed, as well as multiple electrodes are provided facing the edge of the movie film containing a plurality of perforations in the first guide unit, a band shaped conducting material is provided facing multiple electrodes through the movie film in the second guide unit. Under this condition, after detecting each stop position with respect to the window holes based on the displacement rate of each electrostatic capacity changing according to the displacement rate from each stop position of multiple condensers which are formed making each electrode and conducting material as a pole plate respectively, and making the thickness of the movie film as the distance of pole plates, the optical axis correcting means corrects the optical axis of the image light depending on the detection result.

Accordingly, since multiple electrodes are provided facing the edges of the movie film having a plurality of perforations formed along the longitudinal direction of the movie film in the first guide unit and a band shaped conducting material is provided facing multiple electrodes having the movie film between in the guide unit 2, and each stop position with respect to the window hole is detected based on the displacement rate of each electrostatic capacity changing corresponding to the displacement rate from each stop position of multiple condensers which are formed making each electrode and conducting material as the pole plate and the thickness of the movie film as the distance of pole plates, the movie film can be prevented from erroneous position detection caused by dusts or shavings even in the case where dusts stick to the movie film or shavings are produced on the movie film due to relative friction.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 12 is a graph showing the relationship between the parallel transfer rate and the angle of inclination in correcting optical axis of FIG. 11;

FIGS. 13A to 13C are signal wave form diagrams illustrating the operating condition in the image reproduction unit according to the embodiment;

DETAILED DESCRIPTION OF THE EMBODIMENT

Preferred embodiments of this invention will be described with reference to the accompanying drawings:

(1) Construction of Image Reproduction Unit

Figure 2:
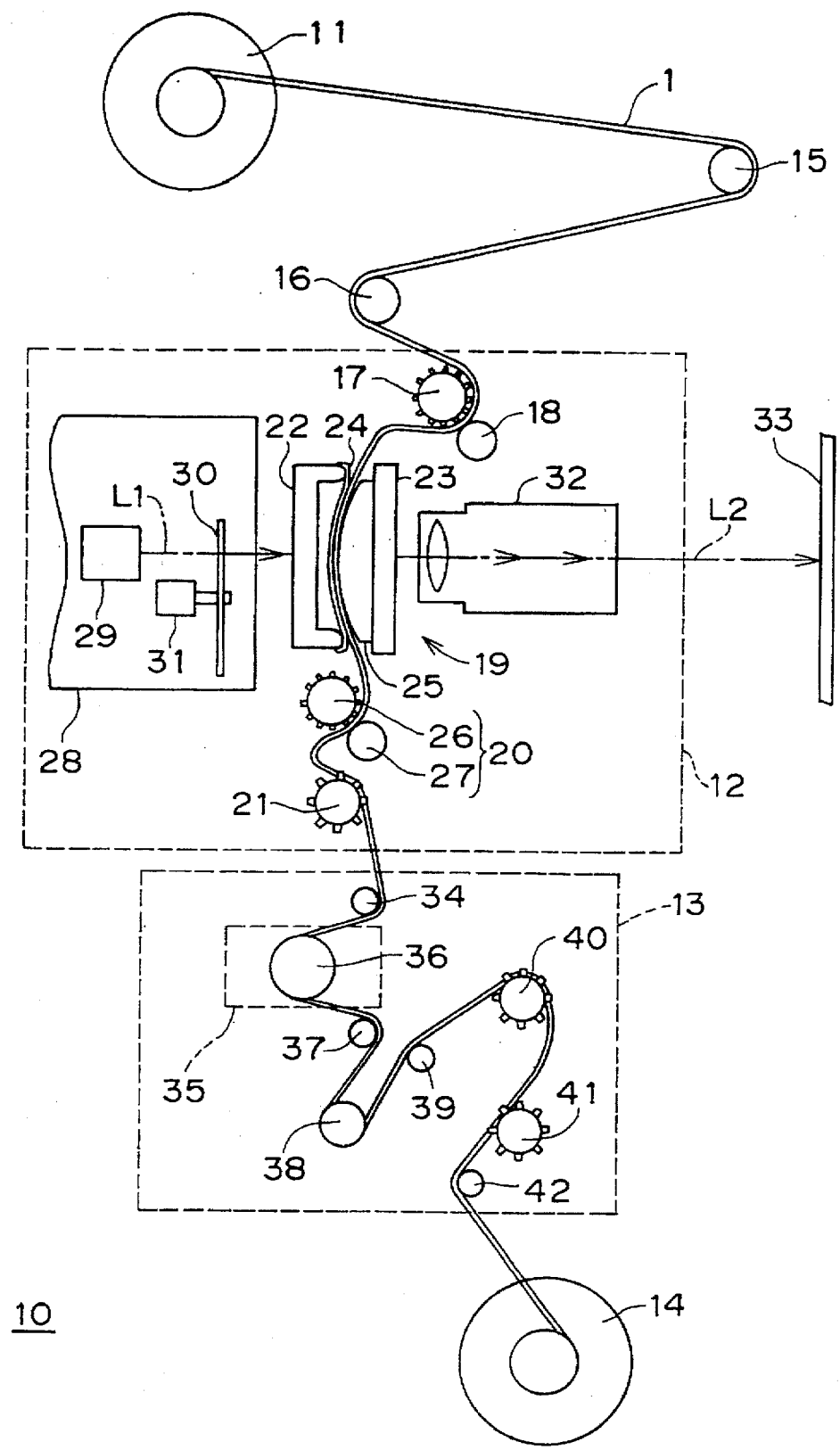
FIG. 2 is a schematic plane diagram showing the construction of a conventional movie film running device.
Figure 4:
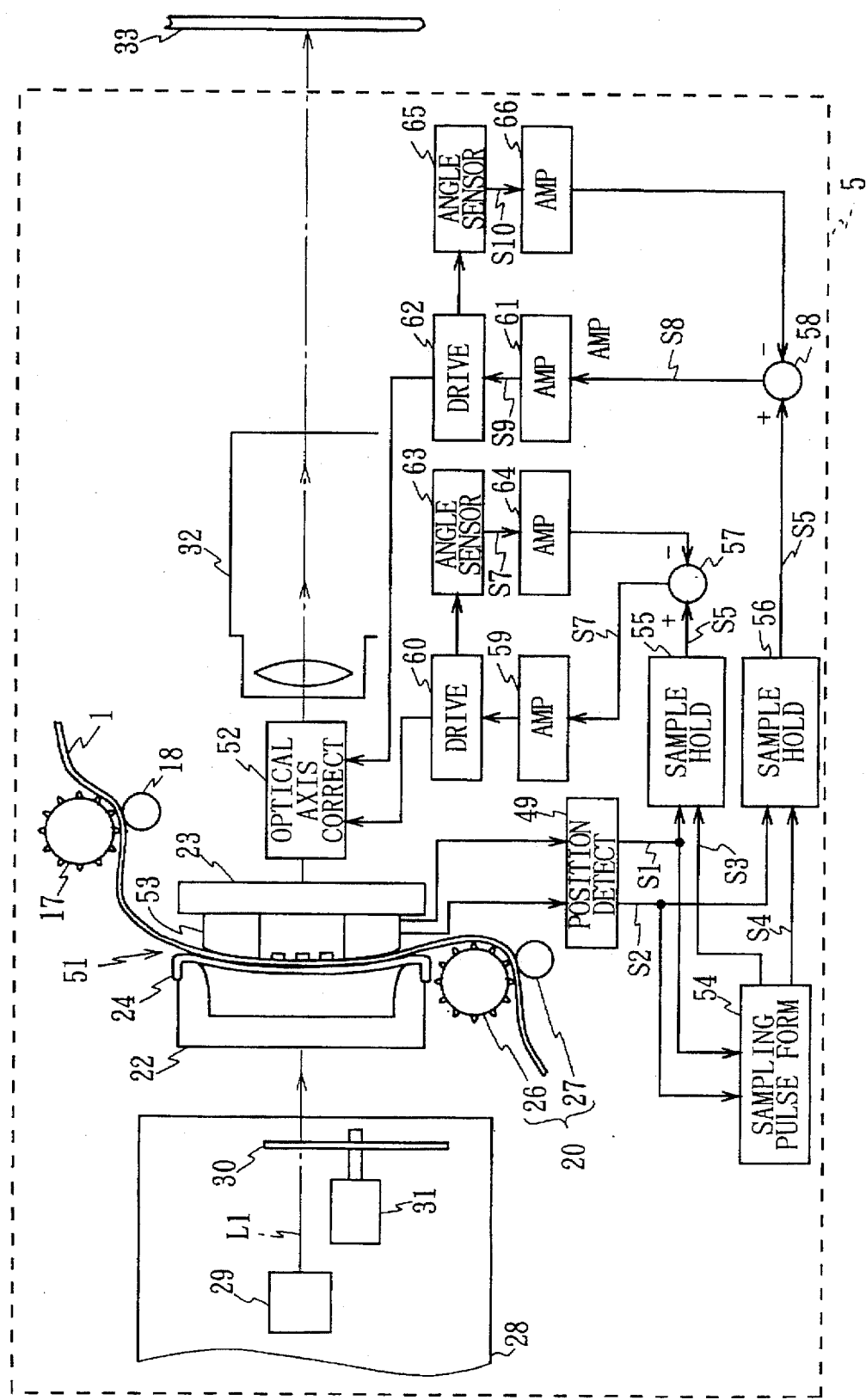
FIG. 4 is a block diagram showing the construction of an image reproduction unit according to one embodiment of the present invention.

In FIG. 4, in which corresponding parts of FIG. 2 are given the same reference numerals, the construction of gate unit 51 of an image reproduction unit 50 in the movie film running device (not shown in figure) is different from the construction of the conventional image reproduction unit 12 and an optical axis correction unit 52 is provided between the gate unit 51 and a picture lens unit 32.

By holding rows of first and second perforations of movie film 1 3A and 3B between the steel band 24 and the guide-shoe 53, the gate unit 51 can detect the position displacement rate of each perforation 2 from the stop position of the movie film 1 based on the picture aperture in the longitudinal direction and transverse direction respectively. Furthermore, the optical axis correction unit 52 can shift an optical axis of projection light beam L1 depending on the position displacement rate of the movie film 1 detected by the gate unit 51.

In the case where the movie film 1 is intermittently forwarded, the gate unit 51 after detecting the position displacement rate in the longitudinal direction of the movie film 1 in the gate unit 51, longitudinal direction detection signal S1 to be obtained via the position detection circuit 49 is sent out to the sampling pulse forming circuit 54, and after being sample held at the sample hold circuit 55, it is sent out as longitudinal direction position signal S5 to a comparator circuit 57. At the same time, after detecting the position displacement rate in the transverse direction of the movie film 1 at the gate unit 51, the transverse direction detection signal S2 to be obtained via the position detection circuit 49 is sent out to the sampling pulse forming circuit 54, and simultaneously, after being sample held at the sample hold circuit 56, it is sent out to the comparator circuit 58 as the transverse direction position signal S6.

Also, at this point, if the movie film 1 is in the stop condition, the sampling pulse forming circuit 54 outputs sampling pulse S3, S4 to sample hold each position signal S5, S6.

The comparator circuit 57 compares longitudinal direction position signal S5 and an angle sensor output of the optical axis correction unit S2, and after amplifying this via an amplifier 59 as a corrected output signal S7 outputs to a drive unit 60. Moreover, the comparator circuit 58 compares the transverse direction position signal S6 and the angle sensor output of the optical axis correction unit S2 and after amplifying via an amplifier 61 as corrected output signal S8, outputs to a drive unit 62.

The drive unit 60 as well as changing the optical axis of the projection optical beam L1 in the optical axis correction unit 52 depending on the corrected output signal S7, outputs the converted angle information to an angle sensor 63. The drive unit 62 as well as changing the optical axis of the projection optical beam L1 in the optical axis correction unit 52 depending on the corrected output signal S8, outputs the converted angle information to an angle sensor 65.

The angle sensor 63 detects the amount of correction of optical axis depending on the angle information obtained from the drive unit 60 and outputs this to the comparator circuit 57 as optical axis corrected detection signal S9 via the amplifier 64. The comparator circuit 57 upon comparing the longitudinal direction position signal S5 obtained by the sample hold circuit 55 and optical axis corrected detection signal S10, outputs the difference between the signal level of position displacement in the longitudinal direction of the movie film 1 and the corrected amount of optical axis corresponding to the position displacement as corrected output signal S7, and thus, the drive unit 60 keeps shifting the optical axis till the optical axis would be corrected.

An angle sensor 65 detects the corrected amount of the optical axis depending on the angle information obtained from the drive unit 62, and outputs this to the comparator circuit 58 as optical axis corrected detection signal S10 via an amplifier circuit 66. The comparator circuit 58, upon comparing the transverse direction detection signal S6 obtained by the sample hold circuit 56 and the optical axis corrected detection signal S10, outputs the difference between the signal level of position displacement in the transverse direction of the movie film 1 and the corrected amount of optical axis depending on the position displacement as the corrected output signal S8, and thus, the drive unit 62 keeps changing the optical axis till the optical axis would be corrected.

(2) Construction of Guide-Shoe

Figure 5:
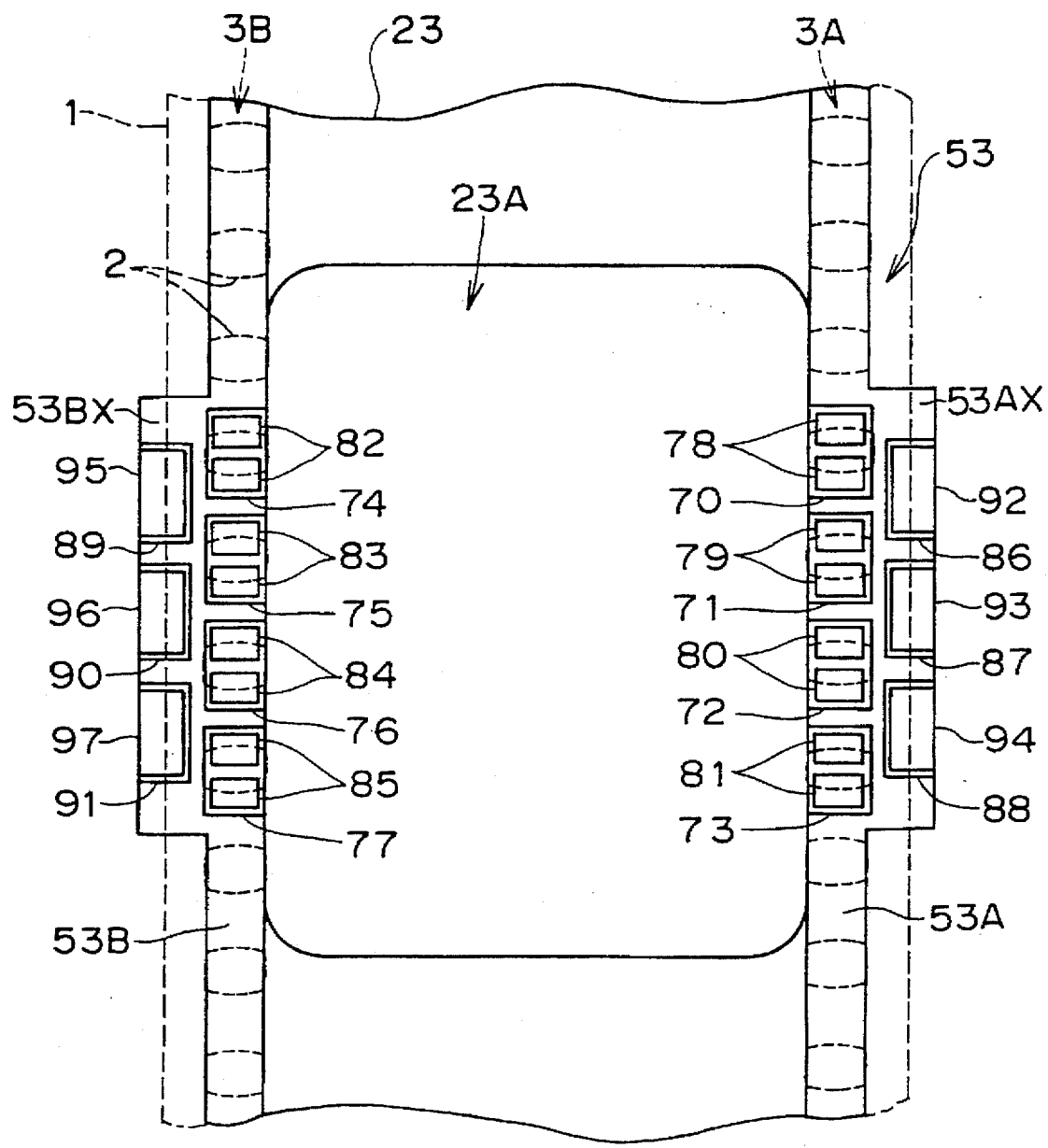
FIG. 5 is a partial plane diagram showing the construction of a guide shoe according to the embodiment.

Here, the construction of the gate unit 51 is approximately similar to that of the conventional gate unit 19 (FIG. 2) except the construction of the guide shoe 53. More specifically, as shown in FIG. 5, the guide shoe 53 is formed of a conducting material such as stainless and faces located on both edge sides in the center part of picture aperture 23 of the pressure plate 23A on the planes 53A and 53B facing the movie film 1 (hereinafter referred to as the position detection plane) 53AX and 53BX are formed extending toward the outer side to become wider than the movie film 1 respectively.

In this case, the steel band 24 has been constructed wide enough so that it can contact the position detection planes 53AX and 53BX fully even though the position detection planes 53AX and 53BX of the guide shoe 53 are extended toward the outer side.

In each position detection plane 53AX, 53Bx, a plurality of grooves (not shown in figure) are formed along rows of the first and second perforations 3A and 3B of the movie film 1 at the fixed intervals respectively and insulators 70 to 77 such as glass are filled up corresponding to these plurality of grooves. These insulators 70 to 77 have a pair of plate electrodes 78 to 85 respectively, as well as exposing their faces, they are buried in order not to connect electrically to each position detection plane 53AX and 53BX.

Furthermore, a plurality of grooves (not shown in figure) are formed at the fixed intervals along both edges of the movie film 1 and insulators 86 to 91 are filled in corresponding to these plural number of grooves respectively. Each of these insulators 86 to 91 has one each plate electrode 92 to 97 respectively, as well as exposing their faces, they are buried in order not to connect electrically to each position detection plane 53AX and 53BX.

In this case, insulators 70 to 77 and multiple plate electrodes 78 to 85 buried in the insulators 70 to 77, and insulators 86 to 91 and multiple plate electrodes 92 to 97 buried in the insulators 86 to 91 are smoothly finished in order that unevenness would not be produced with the position detection planes 53AX and 53BX respectively, and thus the occurrence of scratch marks on rows of the first and second perforations 3A and 3B due to the relative friction can be avoided while the movie film 1 is running.

Figure 6:
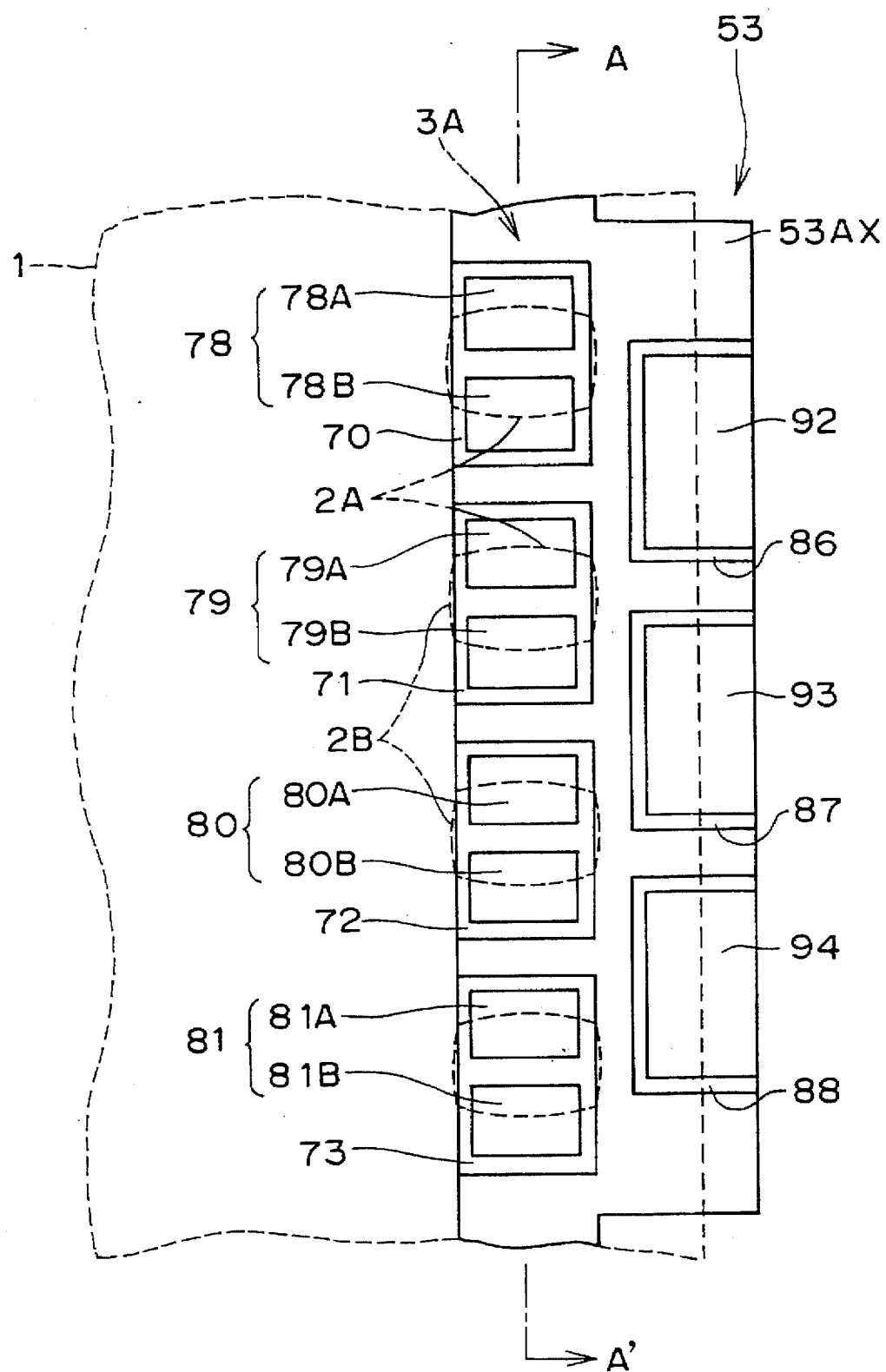
FIG. 6 is an enlarged diagram showing the construction of the guide shoe of FIG. 5

More specifically, as shown in FIG. 6, on one of position detection planes 53AX of the guide shoe 53, four insulators 70 to 73 are buried along a row of the first perforations 3A of the movie film 1 at the same interval as each perforation 2, and a pair of plate electrodes (hereinafter referred to as the first and second electrodes respectively) 78A to 81A and 78B to 81B are provided corresponding to the each insulator 70 to 73.

In this case, the length of the first and second electrodes 78A to 81A and 78B to 81B in the running direction of the movie film 1 is arranged in advance to become shorter than the length of one edge 2B in the transverse direction of each perforation 2. Moreover, the distance between the first and the second electrodes 78A to 81A and 78B to 81B are designed in advance to become shorter than the length of one edge 2B in the transverse direction of each perforation 2.

With this arrangement, in the case where the movie film 1 to be intermittently forwarded is momentarily stopped and each perforation 2 contacts covering the first and second electrodes 78A to 81A and 78B to 81B between (FIG. 6), each perforation 2 contacts only to the first and second electrodes 78A to 81A and 78B to 81B and insulators 70 to 73 but does not contact with the position detection plane 53AX formed of the conducting material other than the first and second electrodes 78A to 81A and 78B to 81B.

Figure 7:
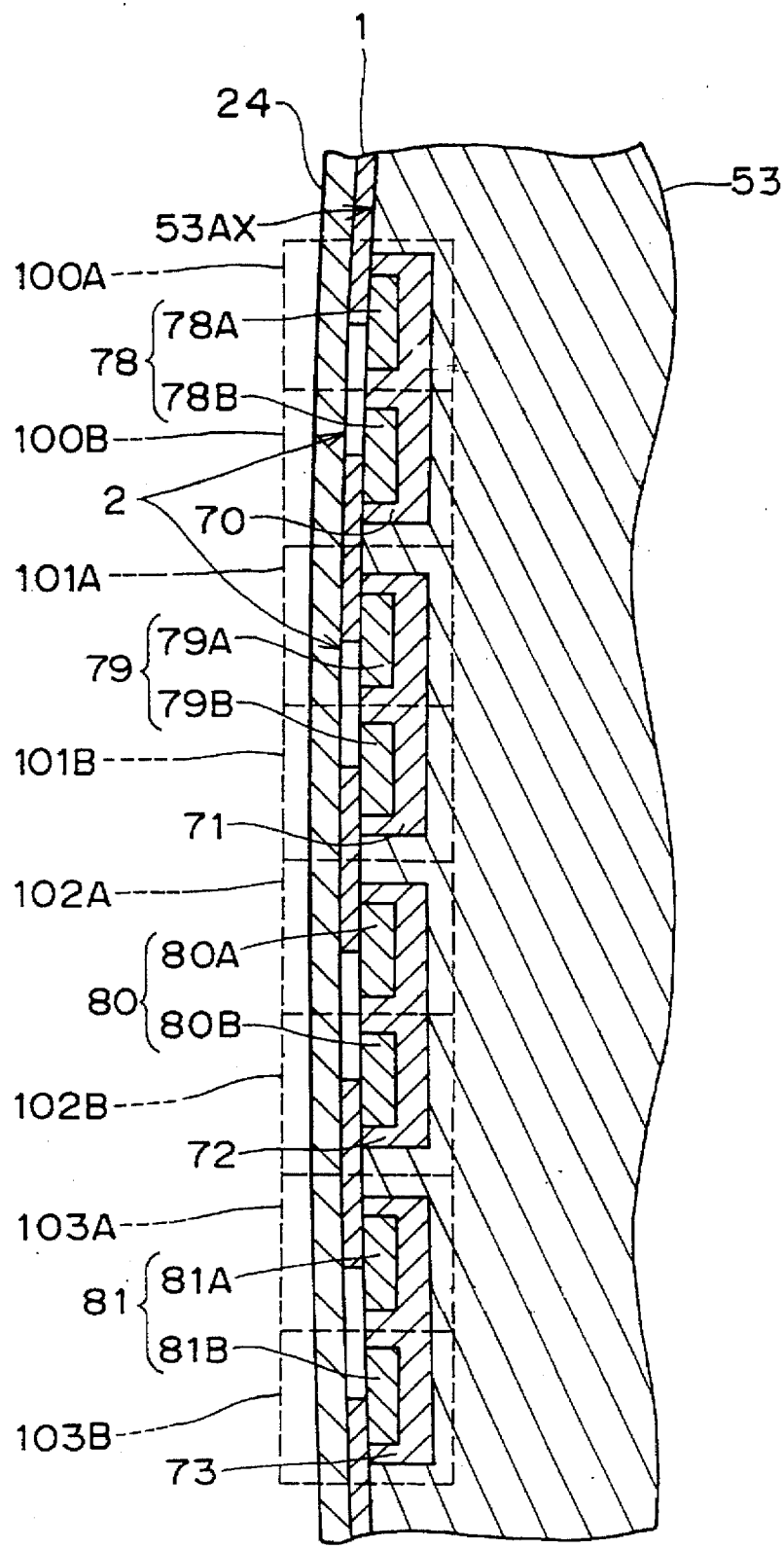
FIG. 7 is a cross sectional view showing the construction of the guide shoe of FIG. 6.

Accordingly, in FIG. 7, a cross sectional view obtained crossing the guide shoe 53 of FIG. 6 by A-A' line, at the time when the movie film 1 is held between the guide shoe 53 and the steel band 24, the steel band 24 is formed of conducting material and since the first and second electrodes 78A to 81A and 78B to 81B are smoothly finished in order not to produce unevenness with the position detection plane 53AX respectively, the steel band 24 and the first and second electrodes 78A to 81A and 78B to 81B form parallel plate condensers (hereinafter referred to as the first and second condensers) 100A to 103A and 100B to 103B respectively.

In this connection, the position detection plane 53AX has a slightly curved shape, but since the lengths in the running direction of the movie film 1 of the first and second electrodes 78A to 81A and 78B to 81B are generally very short, the first and second electrodes 78A to 81A and 78B to 81B and the steel band are treated as parallel.

Similarly, on the other position detection plane 53BX of the guide shoe 53, at the time when the movie film 1 is held between the guide shoe 53 and the steel band 24, since the steel band 24 is made up of conducting material and multiple plate electrodes 82 to 85 are smoothly finished in order not to produce friction between the position detection plane 53BX respectively, the first and the second condensers (not shown in figure) comprising parallel plate condensers respectively are formed by the steel band 24 and multiple electrodes.

On the other hand, as shown in FIG. 6, in the other position detection plane 53AX of the guide shoe 53, one plate electrode (hereinafter referred to as edge electrode) 92 to 94 is arranged corresponding to 3 insulators 86 to 88 buried along the edge of the movie film 1 at the fixed intervals respectively.

In this case, edge electrodes 92 to 94 are designed to form line symmetry placing the edge of the movie film 1 in the center of symmetry. Thus, the movie film 1 always contacts only to a half of edge electrodes 92 to 93 when the movie film 1 is intermittently forwarded.

Accordingly, in the case where the movie film 1 is held between the guide shoe 53 and the steel band 24, since the steel band 24 is formed of conducting material and multiple edge electrodes 92 to 94 are smoothly finished not to produce friction between the position detection plane 53AX, the steel band 24 and edge electrodes 92 to 94 form parallel plate condensers (hereinafter referred to as the third condenser) respectively (not shown in figure).

In this connection, the position detection plane 53AX is slightly curved, but since the length of edge electrodes 92 to 94 in the running direction of the movie film 1 is generally very short, the edge electrodes 92 to 94 and the steel band 24 can be treated as parallel.

Similarly, on the other position detection plane 53BX of the guide shoe 53 in the case where the movie film 1 is held between the guide shoe 53 and the steel band 24, since the steel band 24 is made up of conducting material and multiple plate electrodes 82 to 85 are smoothly finished not to produce friction between the position detection plane 53BX respectively, the third condenser (not shown in figure) comprising parallel plate condensers is formed by the steel band 24 and multiple plate electrodes 82 to 85.

Figure 8:
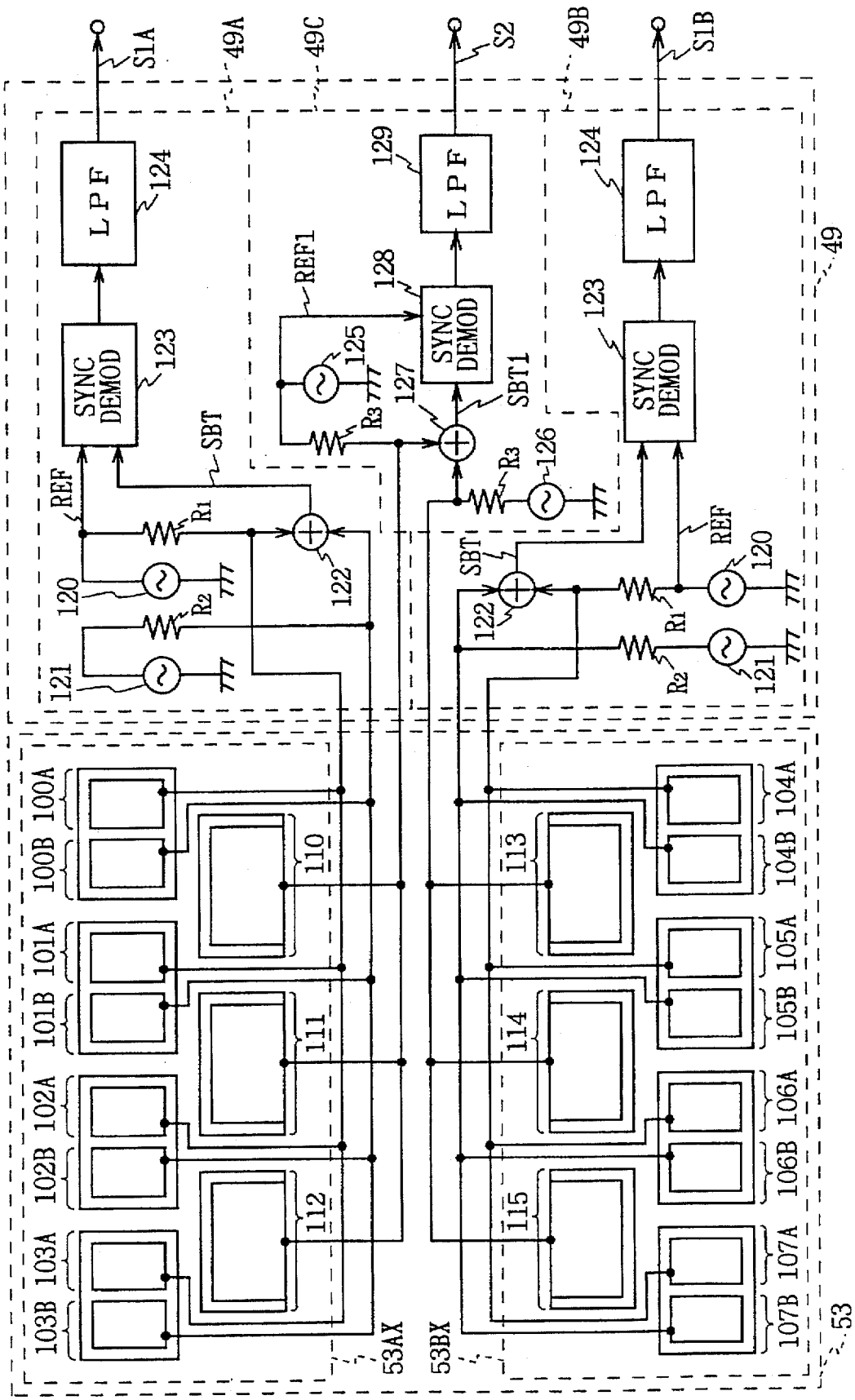
FIG. 8 is a block diagram showing the construction of a position detection circuit according to the embodiment.
Figure 9:
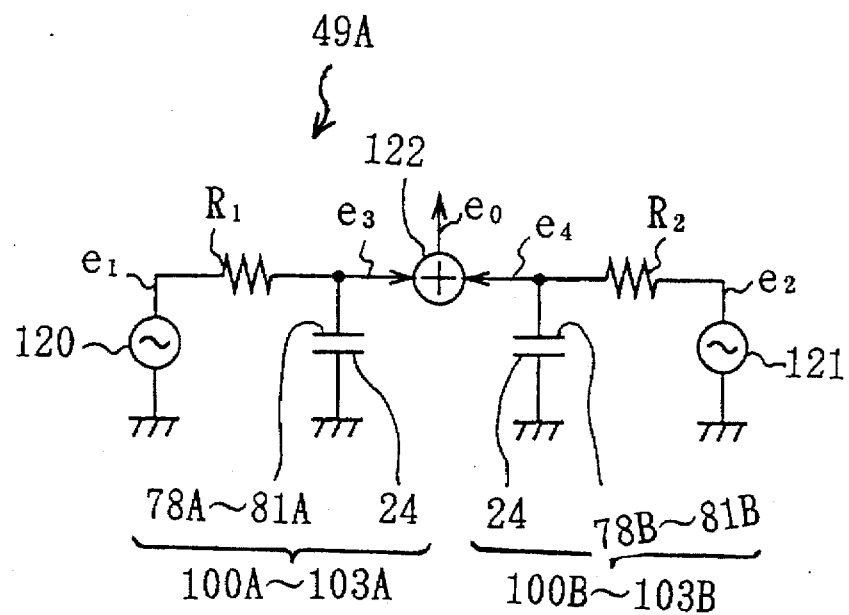
FIG. 9 is a block diagram illustrating the differential detection of electrostatic capacity in the position detection circuit of FIG. 8.

FIG. 8 shows the construction of the guide shoe 53 and the position detection circuit 49. At the time when the movie film 1 is held between the position detection planes 53AX and 53BX of the guide shoe 53 and the steel band 24 (FIG. 4), the first and the second condensers 100A to 107A and 100B to 107B are formed by the steel band 24 and the first and the second electrodes 78A to 85A and 78B to 85B respectively.

At this point, the steel band 24 on the first and the second condensers 100A to 107A and 100B to 107B is connected to the ground respectively, and simultaneously, the first and the second electrodes 78A to 85A and 78B to 85B are electrically connected to the first and the second detection circuit 49A and 48B of the position detection circuit 49 respectively.

Furthermore, as well as the steel band 24 on the third condensers 110 to 115 are connected to the ground, the edge electrodes 92 to 97 are electrically connected to the third detection circuit 49C of the position detection circuit 49.

At this point, firstly in the first detection circuit 49A, an oscillator 120 is connected to an adder 122 via resistance $R_1$, and simultaneously, the part between the resistance $R_1$ and the adder 122 is connected to the other ends of the first condensers 100A to 103A or which one end is grounded. Also, the oscillator 121 is connected to the adder 122 via resistance R2 and simultaneously, the part between the resistance $R_2$ and the adder 122 is connected to the other ends of the second condensers 100B to 103B of which one end is grounded.

Differential signal SBT based on the difference of electrostatic capacity between the first and second condensers 100A to 103A and 100B to 103B will be supplied from the adder 122 to synchronous demodulating unit 123. The synchronous demodulating circuit 123 after synchronous demodulating the differential signal SBT formed of output voltage $e_0$ given from the adder 122 by reference signal REF formed of an output voltage $e_1$ given from the oscillator 120, outputs as longitudinal direction detection signal S1A via low-pass filter (LPF).

In this case, in FIG. 6, in which corresponding parts of FIG. 5 are designated the same reference numerals, the output voltage $e_0$ of the adder 122 changes depending on the difference of the electrostatic capacity between the first and the second condensers 100A to 103A and 100B to 103B. The output voltage $e_0$ of the adder 122 is hereinafter described.

Considering the resistance $R_1$ and electrostatic capacity $C_1$ of the first condenser 100A to 103A, the relationship between an output voltage $e_1$ of the oscillator 120 and an input voltage $e_3$ to be supplied to the adder 122 is expressed as follows:

$$e_3 = \frac{1}{1 + j\omega C_1 R_1} \times e_1 \tag{1}$$

Moreover, the relationship between an output voltage $e_2$ of the oscillator 121 and an input voltage $e_4$ to be supplied to the adder 122 is expressed as follows taking the resistance $R_2$ and the electrostatic capacity $C_1$ of the second condenser 100B to 103B into consideration:

$$e_4 = \frac{1}{1 + j\omega C_2 R_2} \times e_2 \tag{2}$$

However, in this case, output voltage $e_1$ of the oscillator 120 and output voltage $e_2$ of the oscillator 121 have the opposite phase each other and if its voltage value is taken to be "e", then the relationship of the following equations are obtained:

$$e_1 = -e \tag{3}$$

$$e_2 = e \tag{4}$$

Moreover, the resistance $R_1$ and the resistance $R_2$ have the same resistance value R and can be expressed as follows:

$$R_1 = R_2 = R \tag{5}$$

Here, in the movie film 1, the outside area of each row of perforations 3A and 3B in the transverse direction and areas between perforations 2 are formed of insulators such as triacetate (TAC) or polyester (PET). In general, electrostatic capacity of the parallel condenser is in proportion to the facing areas of both pole plates and the dielectric capacity of an insulator between pole plates and since the relative dielectric capacity of the insulator to the air is relatively large, it has a characteristic of showing the higher value when an insulator is inputted between the pole plates than only air exists there.

Accordingly, in the first and the second condensers 100A to 103A and 100B to 103B, in the case of intermittently sending the movie film 1, electrostatic capacities show the different values respectively depending on whether each perforation 2 of the movie film 1 is positioned on the first and the second electrodes 78A to 81A and 78B to 81B or not.

In the case where each perforation 2 of the movie film 1 is positioned on the first electrode 78A to 81A, the electrostatic capacity $C_1$ of the first condenser 100A to 103A, i.e., when a space between pole plates is filled with air, shows the minimum value. On the other hand, each perforation 2 of the movie film is not positioned on the first electrode 78A to 81A, i.e., a space between pole plates is filled with an insulator, shows the maximum value.

Similarly, the electrostatic capacity $C_2$ of the second condenser 100B to 103B shows the minimum value when each perforation 2 of the movie film is positioned on the second electrode 78B to 81B, whereas the electrostatic capacity $C_2$ shows the maximum value when each perforation 2 of the movie film 1 is not positioned on the second electrode 78B to 81B.

Accordingly, if the value of electrostatic capacity at the time when each space between pole plates is filled with air is taken to be "C", the electrostatic capacities $C_1$ and $C_2$ of the first and the second condensers 100A to 103B and 100B to 103B become the values adding the amount of change of electrostatic capacities $\Delta C_1$ and $\Delta C_2$ in the case where the insulators are inserted partly or fully between the pole plates and can be expressed in the following equations respectively:

$$C_1 = C + \Delta C_1, \text{ where, } C \gg \Delta C_1 \quad (6)$$

$$C_2 = C + \Delta C_2, \text{ where, } C \gg \Delta C_2 \quad (7)$$

Since the output voltages $e_1$ and $e_2$ have the opposite phases each other, the output voltage $e_0$ of the adder 122 can be obtained by adding input voltages $e_3$ and $e_4$ in the adder 122 and can be expressed in the following equation by substituting equations (3) to (7):

$$\begin{aligned} e_0 &= e_3 + e_4 \\ &= \frac{-e}{1+j\omega(C+\Delta C_1)R} + \frac{e}{1+j\omega(C+\Delta C_2)R} \\ &= \frac{j\omega(\Delta C_1 - \Delta C_2)}{(1+j\omega CR)^2} \end{aligned} \quad (8)$$

According to the result of experiments, the resolution of film position detection by the first and the second condensers 100A to 103A and 100B to 103B is 1 μm unit, i.e., it is known that 1 mv voltage changes per 1 μm.

On the other hand, the second detection circuit 49B is formed by the same construction as the first detection circuit 49A, and the differential signal SBT based on the difference of electrostatic capacity between the first and the second condensers 104A to 107A and 104B to 107B is supplied to the synchronous demodulation unit 123 from the adder 122. The synchronous demodulating unit 123 after synchronous demodulating the differential signal SBT formed of the output voltage $e_0$ given from the adder 122 by reference signal REF formed of the output voltage $e_1$ given from the oscillator 120, outputs as longitudinal direction detection signal S1B through LPF 124.

Furthermore, in the third detection circuit 49C, oscillators 125 and 126 are connected to one ends of the third condensers 110 to 112 and 113 to 115 of which the other ends are grounded via resistance $R_3$ respectively. In this third condensers 110 to 112 and 113 to 115, in the case where the movie film 1 is forwarded intermittently, both edges of the movie film 1 are positioned to divide the edge electrodes 92 to 94 and 95 to 97 into two respectively, and at this point, transverse detection signal S2 is outputted in the same manner as that of the running direction position detection depending on the electrostatic capacity difference between the third condensers 110 to 112 and 113 to 115.

More specifically, the differential signal SBT1 based on the difference of electrostatic capacities between the third condensers 110 to 115 is supplied to synchronous demodulation unit 128 from an adder 127. The synchronous demodulation unit 128, after synchronous demodulating the differential signal SBT1 formed of the output voltage $e_0$ given from the adder 127 by the reference signal REF1 formed of the output voltage $e_1$ given from the oscillator 125, outputs as a transverse direction detection signal S2 via a low pass filter (LPF) 129.

(3) Construction of Optical Axis Correction Unit

Figure 10:
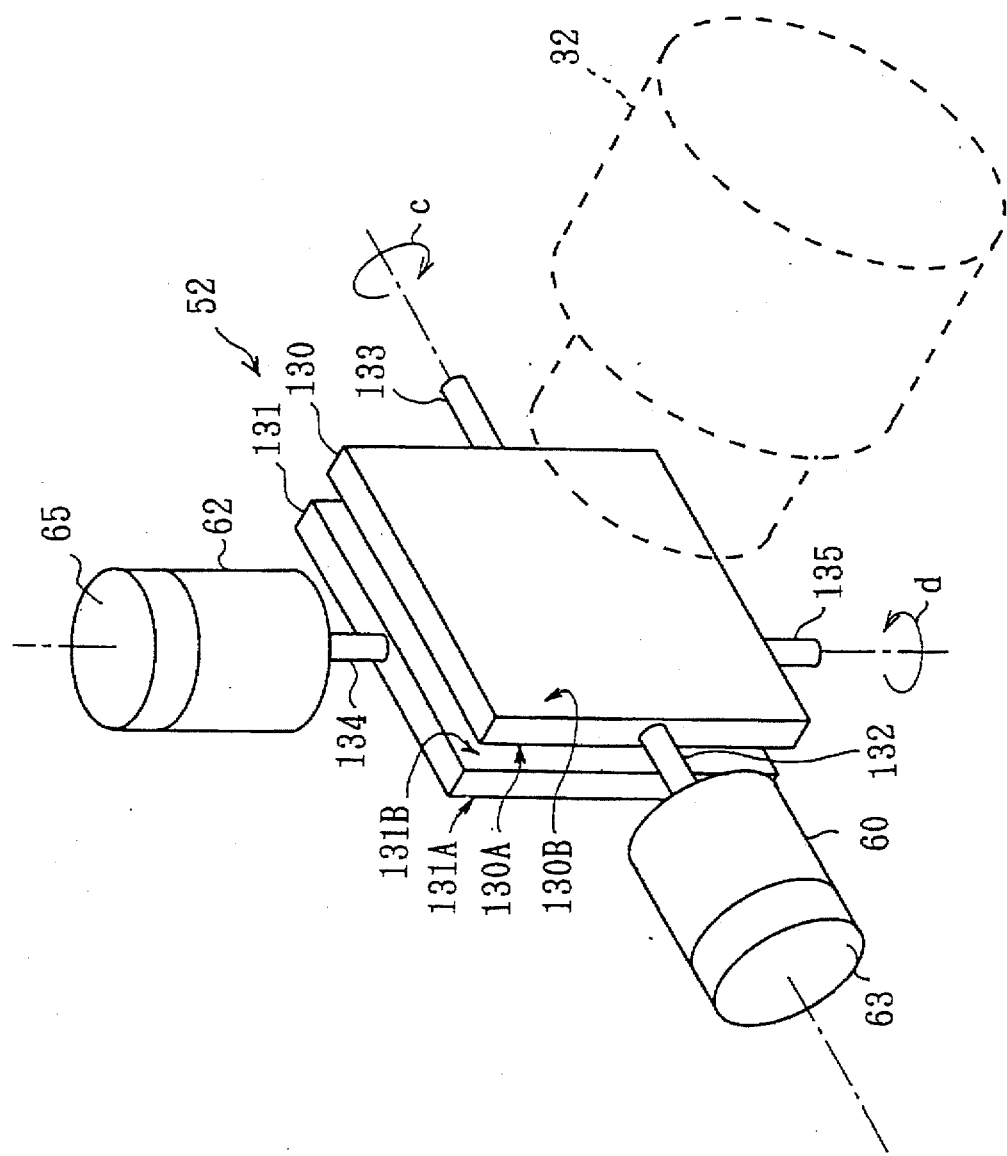
FIG. 10 is a perspective view showing an optical axis correction unit according to the embodiment.

FIG. 10, in which the corresponding parts of FIG. 4 are given the same reference numerals, an optical axis correction unit 52 is equipped with the first and the second plane plates 130 and 131, and the first and second plane plates 130 and 131 are formed of glass materials having the same refractive index.

The first plane plate 130 is attached with shafts 132 and 133 to its one side edge and the other side edge making an output axis of the motor (drive unit) 60 as the same axle and the first plane plate 130 can rotate in the direction as shown by an arrow "c" or in the reverse direction making the shafts 132 and 133 as a spindle. Also, the shaft 132 is connected to the output axis of the motor 60.

The second plane plate 131 is attached with shafts 134 and 135 to its one side edge and the other side edge making an output axis of the motor (drive unit) 62 as the same axle and this plane plate 131 can turn on the shafts 134 and 135 in the direction as shown by an arrow "d" or the reverse direction. Also, the shaft 134 is connected to the output axis of the motor 60.

Here, the output axes of motors 60 and 62 are arranged to have the vertical relationship each other. Moreover, the motor 60 is equipped with an angle sensor 63 and the rotation capacity of the first plane plate 130 can be detected based on an angle of rotation of the shaft 132 and thus, the corrected capacity of optical axis of the projection optical beam L1 can be detected. Furthermore, the motor 62 is equipped with an angle sensor 65 and the rotation capacity of the second plane plate 131 can be detected based on an angle of rotation of the shaft 134, and thus, the corrected capacity of optical axis of the projection optical beam L1 can be detected.

Figure 11:
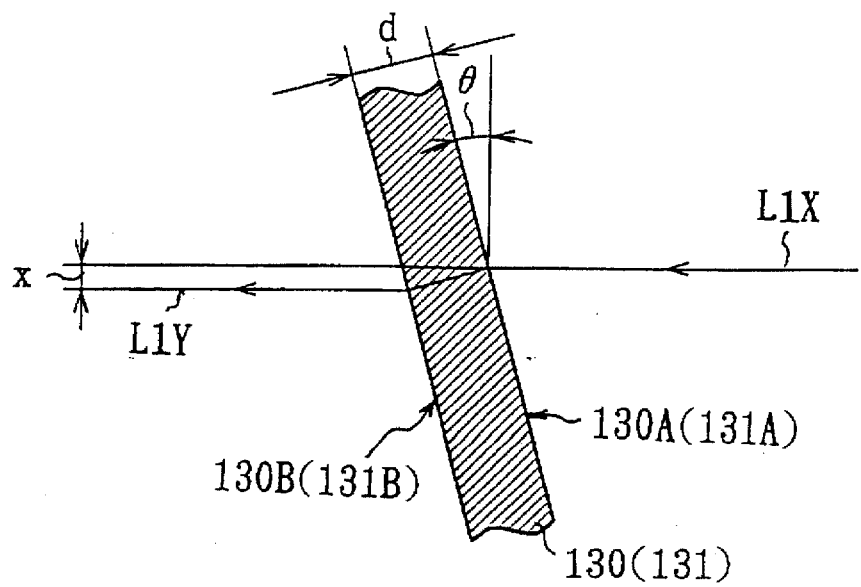
FIG. 11 is a cross sectional view illustrating the optical axis correction by the optical axis correction unit of FIG. 10.

Of the optical axis correction unit 52 shown in FIG. 10, FIG. 11 shows a cross sectional view of a plane to be formed by the optical axis (not shown in figure) of the projection optical beam L1 and the output axis of the motor 60. When the first plane plate 130 is in the position parallel to the plane to be formed by the output axes of motors 60 and 61 in FIG. 11, optical axis L1X of the outside plane 130A side and optical axis L1Y of the inside plane 130B side are coincided with each other.

Moreover, in the case of turning on the first plane plate 130 in the direction shown by an arrow "c" or in the opposite direction centering around shafts 132 and 133 and slanting the first plane plate in order that the angle to be formed between the outer plane 130A and the plane formed by output axes of the motors 60 and 62 becomes θ, the optical axis L1X of the outside plane unit 130A side moves by "x" with respect to the optical axis L1Y of the inside plane unit 130B side in parallel to the output axis of the motor 62.

Furthermore, of the optical axis correction unit 62 shown in FIG. 10, a cross sectional view of a plane to be formed by the optical axis (not shown in figure) of projection optical beam L1 and the output axis of the motor 62 can be shown in the same manner as that of FIG. 11. In FIG. 11 when the second plane plate 131 is in the position parallel to the plane to be formed by the output axes of the motors 60 and 62, optical axis L1X of the outside plane unit 131A side and optical axis L1Y of the inside plane unit 131 side are coincided.

Next, in the case of turning on the second plane plate 131 in the direction shown by an arrow "d" or in the opposite direction centering around the shafts 134 and 135 and slanting this plane in order that an angle between the outside plane unit 131A and the plane to be formed by output axes of the motors 60 and 62 becomes θ, the optical axis L1X of the outside plane unit 131A side moves by "x" with respect to the optical axis L1Y of the inside plane unit 131B side in parallel to the output axis of the motor 60.

At this point, as regards to the first and the second plane plates 130 and 131, let the thickness of glass material to be "d" and the refractive index to be "n", the following equation exists between θ and "x":

$$X = \{d \tan\theta - d \tan(\sin^{-1}(\sin\theta/n))\} \times \tan(\pi/2 - \theta) \quad (9)$$

In the equation (9) the parallel transfer rate can be expressed as the function of θ, and in the case where the value of θ is small, "x" is approximately proportional to θ and can be expressed by straight lines K10, K20 and K30 which vary according to the refractive index n as shown in FIG. 12. In this case, the straight line K10 shows the case of d=2, n=1.2, the straight line shows the case of d=2, n=1.5 and the straight line K30 shows the case of d=2, n=2.0. For example, a point P on the straight line K20 shows when θ is tilted by 4°, the optical axis L1X moves by x=0.05 mm in parallel. Accordingly, the function of "x" and θ, at the time when the value of θ is small, the bigger the value of "n", the value of "x" becomes bigger.

(4) Operation Timing in the Image Reproduction Unit

Next, the timing of operations of the intermittent forward sprocket 26, the optical axis correction unit 52 and the projection shutter 30 in the image reproduction unit 50 (FIG. 4) is shown in FIGS. 13A to 13C.

Firstly, in the case where the movie film 1 is forwarded intermittently by the intermittent forward sprocket 26, the movie film 1 starts running at the time point to (FIG. 13A) and simultaneously, the projection shutter 30 becomes closed condition (FIG. 13C).

During the time point $t_2$ when the film is stopped to the time point $t_3$, the optical axis correction unit 52 corrects the optical axis of projection light beam L1 depending on the position information on each perforation 2 of the movie film 1 and both edges (FIG. 13B), and then at the time point $t_4$, the projection shutter becomes the opened condition (FIG. 13C).

Similarly, during the time point $t_5$ to the time point $t_8$, and also during the following time point $t_9$ to the time point $t_{12}$, since the movie film 1 stops and corrects the optical axis when the projection shutter 30 is closed, the projection shutter 30 can be opened for comparatively long period of time, and at the same time, the image screen distortion can be prevented without producing dark-light flickers on the screen to be projected on the screen 33.

(5) Operation of the Embodiment

According to the foregoing construction, at the time when the stop position of the movie film 1 with respect to the picture aperture 23A in the gate unit 51 is in the stable condition, as well as the first and the second electrodes 78A to 85A and 78B to 85B are positioned on the fixed positions corresponding to each synchronous perforation 2 in the stop position of the movie film 1, the edge electrodes 92 to 97 are positioned corresponding to both edges in the stop position of the movie film 1.

At this point, the electrostatic capacity of the first and second condensers 100A to 107A and 100B to 107B and the electrostatic capacity of the third condenser 110 to 115 become the reference value.

In the case where the position displacement occurs in the running direction of the movie film 1 when the movie film 1 is intermittently forwarded, each perforation 2 arranged between pole plates of the first and the second condensers 100A to 107A and 100B to 107B is shifted from the stable stop position, and as a result, each electrostatic capacity of the first and second condensers 100A to 107A and 100B to 107B is changed from the reference value corresponding to the position displacement rate of the movie film 1.

At this point, the sampling pulse forming circuit 54 detects the sample timing from the position detection signal S1 obtained from the amount of change of each electrostatic capacity of the first and second condensers 100A to 107A and 100B to 107B and then supplies the sample held position detection result to the optical axis correction unit 52. Thus, the optical axis correction unit 52 is capable of correcting the optical axis of the projection light beam L1 in the running direction of the movie film 1 depending on the detection result when the movie film 1 is in the stop running condition.

On the other hand, in the case where the position displacement occurs in the transverse direction of the movie film 1 when the movie film 1 is to be intermittently forwarded, both edges of the movie film 1 between each pole plate of the third condenser 110 to 115 move from the stable stop position and each electrostatic capacity of the third condensers 110 to 115 varies from the reference value corresponding to the position displacement rate of the movie film 1. At this moment, the sampling pulse forming circuit 54 after detecting the sample timing from the position detection signal S2 obtained from the amount of change of each electrostatic capacity of the third condensers 110 to 115, supplies the sample held position detection result to the optical axis correction unit 52. Thus, the optical axis correction unit 52 is capable of correcting the optical axis of the projection light beam L1 in the transverse direction of the movie film 1 depending on the detection result while the movie film 1 is in the stop running condition.

Figure 1:
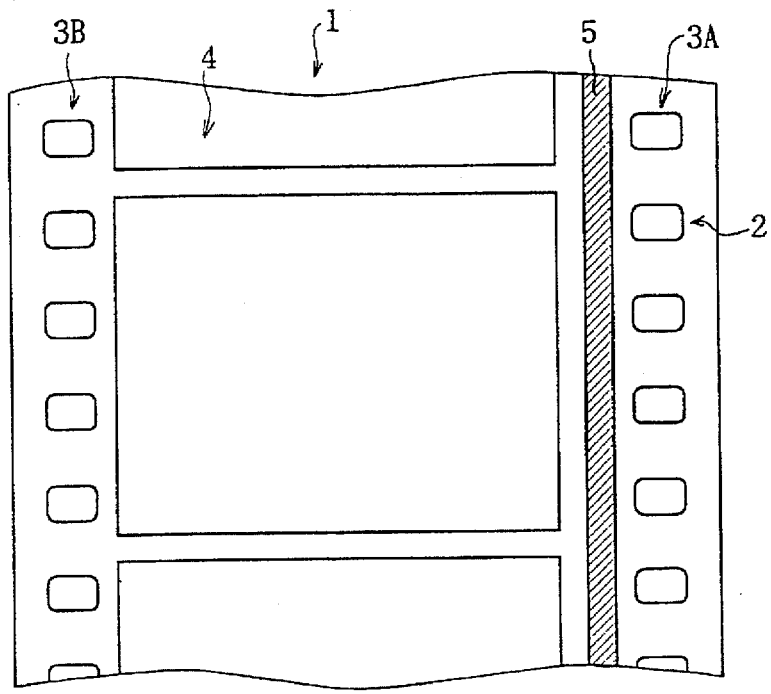
FIG. 1 is a plane diagram showing a conventional movie film.
Figure 3:
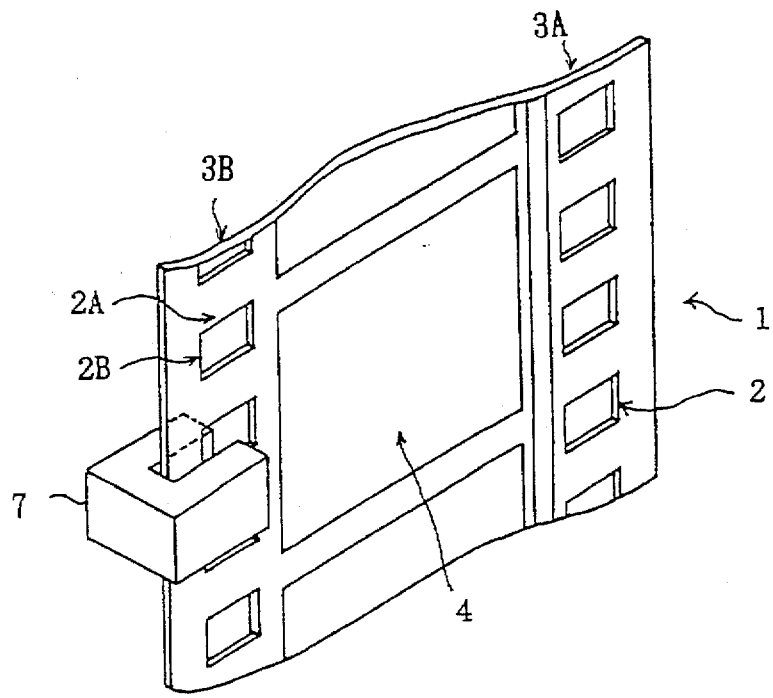
FIG. 3 is a schematic diagram showing the construction of a conventional photo sensor.

Accordingly, since the position of the movie film 1 in the running direction and/or in the transverse direction is detected, in the case where dust sticks on the movie film 1 or shavings are produced on the movie film 1 due to the relative friction, the movie film 1 is completely free from the influence by the dust or shavings. If the dust or shavings stick to the plane between the guide shoe 53 and the steel band 24, they can be removed from the plane between the guide shoe 53 and the steel band 24 as the movie film 1 runs. Thus, the reliability of position detection can be remarkably improved as compared with the detecting method by optic irradiation in utilizing the conventional photo-sensor 7 (FIG. 1).

In addition, in respect of the sway of movie film itself in running of the movie film, the sway of movie film in the transverse direction is practically larger than that in the running direction, and the sway of movie film in the transverse direction is more conspicuous. Therefore, it is effective even if the position only in the transverse direction is detected and the optical axis only in the transverse direction is corrected.

Furthermore, in case of detecting the position of the movie film 1 in the running direction, since the plural number of pair of the first and second electrodes 78A to 85A and 78B to 85B are provided on the position detection planes 53AX and 53BX of the guide shoe 53 respectively and the positions of a plurality of perforations 2 are to be detected corresponding to these, the integral effects can be obtained as compared with the case of detecting the position of single perforation 2 and as a result, the position detecting accuracy in the running direction of the movie film 1 can be remarkably improved.

Moreover, in case of detecting the position of movie film 1 in the transverse direction, since multiple edge electrodes 92 to 97 are provided on the position detection planes 53AX and 53BX of the guide shoe 53 and then, the positions of both edges of the movie film 1 are to be detected, the position detecting accuracy in the transverse direction of the movie film 1 can be remarkably improved as compared with the case where single edge electrode is provided.

Furthermore, in the gate unit 51, in case of detecting the position of the movie film 1, since it is enough to provide the first and second electrodes 78A to 85A and 78B to 85B and the edge electrodes 92 to 97 to the guide shoe 53 side and the conventional device can be applied to the steel band 24 side as it is, the construction of the gate unit 51 can be relatively simplified.

Moreover, in this case, since the position detecting means of the movie film 1 is provided by directly working on the guide shoe 53 without mounting a delicate device such as a photo sensor in the gate unit 51, it becomes unnecessary to secure more spaces in the gate unit 51 and the construction of the gate unit 51 can be relatively simplified.

(6) Effects of the Embodiment

According to the foregoing construction, since the first and second electrodes 78A to 85A and 78B to 85B and edge electrodes 92 to 97 are provided on the guide shoe 53 side of the gate unit 51, the first to the third condensers 100A to 107A, 100B to 107B and 110 to 115 are formed by the first and second electrodes 78A to 85A and 78B to 85B, and edge electrodes 92 to 97 and steel band 24, and the position of the movie film 1 is to be detected depending on the amount of change of each electrostatic capacity of the first to the third condensers 100A to 107A, 100B to 107B and 110 to 115 which are changing corresponding to the position displacement of the movie film 1, the position detecting accuracy of the movie film 1 can be improved with the simple construction.

(7) Other Embodiments

Figure 14:
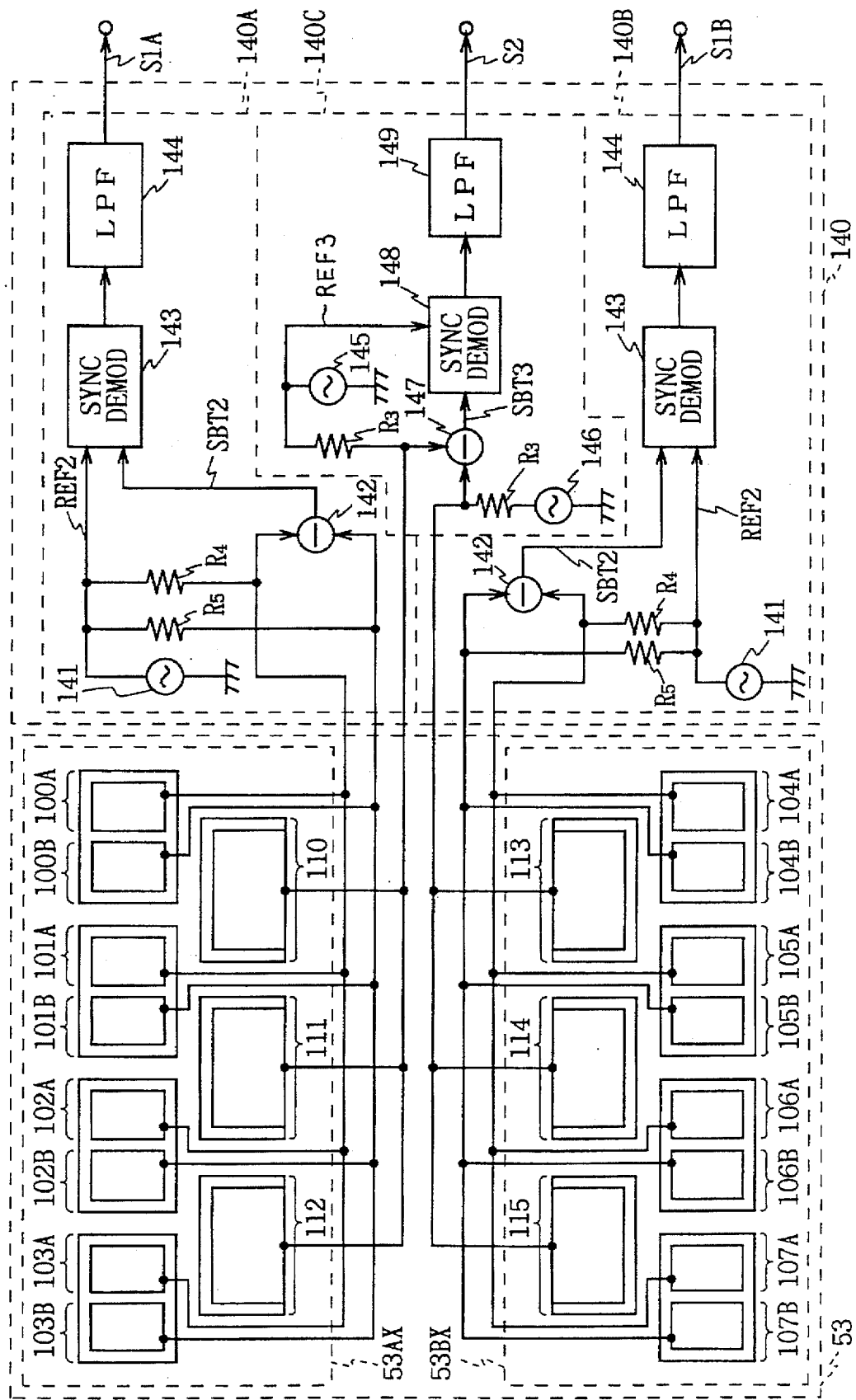
FIG. 14 is a block diagram showing the construction of position detection circuit according to the other embodiment.

The foregoing embodiments have been described in connection with a position detection circuit 49 which is constructed as shown in FIG. 8. However, the present invention is not only limited to this but a position detection circuit 140 as shown in FIG. 14, where parts corresponding to those in FIG. 8 are designated the same reference numerals can be used. More specifically, in the first detection circuit 140A of the position detection circuit 140, an oscillator 141 is connected to a subtractor 142 through resistance $R_4$ and $R_5$. Moreover, the other end of the first condenser 100A to 103A of which one end is ground connected is connected to the point between the resistance $R_4$ and the subtractor 142, and simultaneously the other end of the second condenser 100B to 103B of which one end is grounded is connected to the point between the resistance $R_5$ and the subtractor 142.

From the subtractor 142 differential signal SBT2 based on the difference between electrostatic capacities of the first and the second condensers, 100A to 103A and 100B to 103B is supplied to the synchronous demodulation unit 143. The synchronous demodulation unit 143, after synchronous demodulating the differential signal SBT2 formed of an output voltage $e_0$ given from the subtractor 142 by the reference signal REF2 formed of an output voltage $e_5$ given by the oscillator 141, outputs as longitudinal direction detection signal S1A through the low pass filter (LPF) 144.

Figure 15:
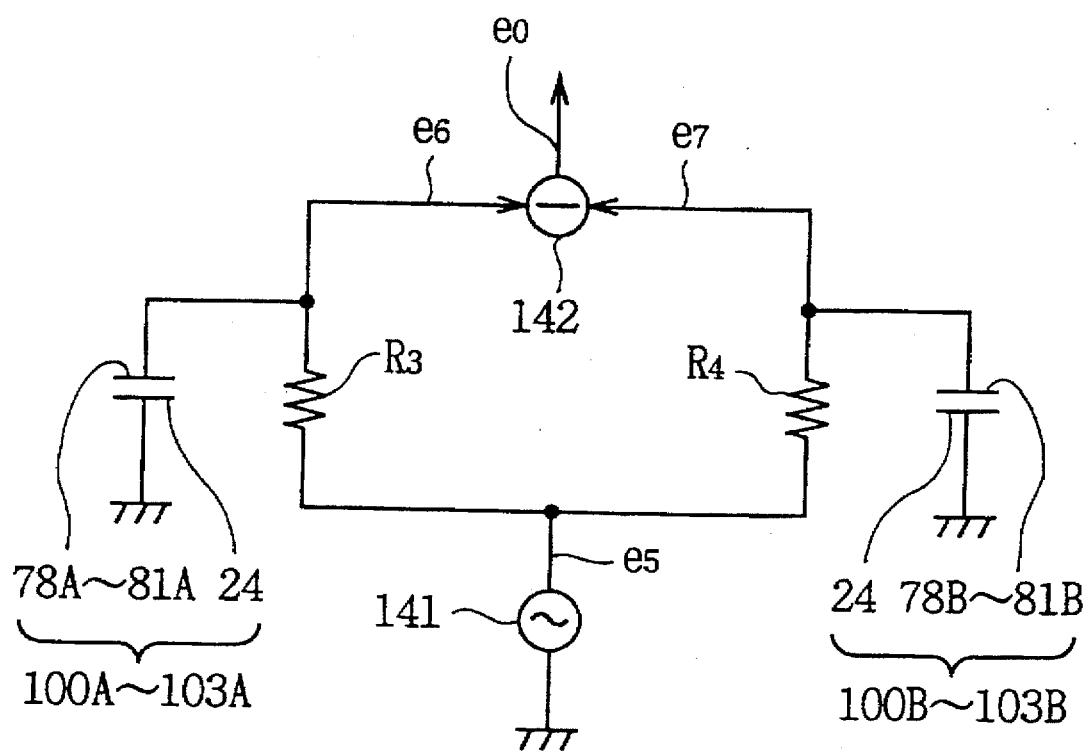
FIG. 15 is a block diagram illustrating the differential detection of electrostatic capacity in the position detection circuit of FIG. 14.

In this case, in FIG. 15, in which the corresponding parts of FIG. 14 are given the same reference numerals, the output voltage $e_0$ of the subtractor 142 varies depending on the difference between electrostatic capacities of the first and second condensers 100A to 103A and 100B to 103B. The output voltage $e_0$ of the subtractor 142 will be described as follows:

Firstly, the relationship between an output voltage $e_5$ of the oscillator 141 and an input voltage $e_6$ to be supplied to the subtractor 142 can be expressed in the following equation considering the resistance $R_4$ and the electrostatic capacity $C_1$ of the first condenser 100A to 103A:

$$e_6 = \frac{1}{1+j\omega C_1 R_4} \times e_5 \qquad (10)$$

Moreover, the relationship between the output voltage $e_5$ of the oscillator 141 and an input voltage $e_7$ to be supplied to the subtractor 142 can be expressed in the following equation considering the resistance $R_5$ and the electrostatic capacity $C_2$ of the second condenser 100B to 103B:

$$e_7 = \frac{1}{1+j\omega C_2 R_5} \times e_5 \qquad (11)$$

However, in this case, the output voltage $e_5$ of the oscillator 141 has the same phase with respect to input voltages $e_6$ and $e_7$ to be supplied to the subtractor 142, and let its voltage value to be "e", the following relation will be obtained:

$$e_5 = e \qquad (12)$$

Also, the resistances $R_4$ and $R_5$ have the same resistance R and can be expressed in the following equation:

$$R_4 = R_5 = R \qquad (13)$$

Accordingly, since the output voltage $e_0$ of the subtractor 142 has the same phase as the input voltages $e_6$ and $e_7$ to be supplied to the subtractor, it can be obtained by subtracting the input voltages $e_6$ and $e_7$ in the subtractor 142 and can be expressed in the following equation by substituting equations (6) and (7) and (10) to (13):

$$\begin{aligned} e_0 &= e_7 - e_6 \\ &= \frac{e}{1+j\omega(C+\Delta C_2)R} - \frac{e}{1+j\omega(C+\Delta C_1)R} \\ &= \frac{j\omega(\Delta C_1 - \Delta C_2)}{(1+j\omega C R)^2} \end{aligned} \qquad (14)$$

On the other hand, the second detection circuit 140B has the same construction as the first detection circuit 140 and the differential signal SBT2 based on difference of electrostatic capacities between the first and second condensers 104A to 107A and 104B to 107B is supplied to the synchronous demodulation unit 143 from the subtractor 142. The synchronous demodulation unit 143 after synchronous demodulating the differential signal SBT2 formed of the output voltage $e_0$ supplied from the subtractor 142 by reference signal REF2 formed of the output voltage $e_1$ given from the oscillator 141, outputs it as longitudinal direction detection signal S1B through the LPF 144.

Furthermore, in the third detection circuit 140C, the oscillators 145 and 146 are connected to the other ends of third condensers 110 to 112 and 113 to 115 of which one ends are ground connected through the resistance $R_6$ respectively. In this third condenser 110 to 115, when the movie film 1 is intermittently forwarded, both edges of the movie film 1 are positioned to divide edge electrodes 92 to 94 and 95 to 97 into two respectively, and at this point, transverse direction detection signal S2 is outputted depending on the electrostatic capacity difference between the third condensers 110 to 112 and 113 to 115 in the same manner as in the running direction position detection.

More specifically, a differential signal SBT3 based on the electrostatic capacity difference is supplied to the synchronous demodulation unit 148 from the subtractor 147. The synchronous demodulation unit 148, after synchronous demodulating the differential signal SBT3 formed by output voltage $e_0$ given from the adder by the reference signal REF3 formed by output voltage $e_1$ given from the oscillator 145, outputs as transverse direction detection signal S2 through the low pass filter (LPF) 149.

With this arrangement, in the position detection circuit 140 longitudinal direction detection signals S1A and S1B which are obtained by detecting the electrostatic capacity difference between the first and the second condensers 104A to 107A and 104B to 107B and the transverse direction detection signal S2 to be obtained by detecting the electrostatic capacity of the third condenser 110 to 115 can be outputted, and as a result, the same effects as those of the position detection circuit 49 of FIG. 8 can be obtained.

Furthermore, the embodiments described above have dealt with the case of providing four each of first and second electrodes 78A to 85A and 78B to 85B and three numbers of edge electrodes 92 to 97 on the position detection planes 53AX and 53BX of the guide shoe 53 in the first guide unit respectively. However, the present invention is not only limited to these, but less than three or more than five electrodes can be arranged on each position detection plane 53AX and 53BX provided that the first and the second electrodes are arranged at the same intervals as the perforations 2 and a pair of electrodes are arranged corresponding to each perforation and fixed numbers other than three edge electrodes 92 to 97 can be arranged.

Furthermore, the embodiments described above have dealt with the case of arranging the first and the second electrodes 78A to 85A and 78B to 85B and edge electrodes 92 to 97 on both position detection planes 53AX and 53BX in the guide shoe 53. However, the present invention is not only limited to this but also multiple electrodes can be arranged on either one of position detection planes 53AX and 53BX.

Moreover, the embodiments described above have dealt with the case of arranging detection electrodes for position detecting in the transverse direction of film on the film edge unit. However, the present invention is not only limited to this but also electrodes can be arranged in the perforation unit and positions in the transverse direction may be detected.

Furthermore, the embodiments described above have dealt with the case of pressing the movie film 1 down to the guide shoe 53 by the steel band 24 and using this steel band as an electrode. However, the present invention is not only limited to this, but a fixed spatial electrode having the fixed distance from the guide shoe 53 can be used in place of the steel band 24. In this case, the space between this fixed spatial electrode and the electrode on the guide shoe 53 is kept wider than the thickness of the movie film 1. Thus, the film position detection accuracy can be improved. In this case, the pressing mechanism such as a plate spring my be provided in the part other than electrode of the guide shoe 53 to press down the movie film 1.

Furthermore, the embodiments described above have dealt with the case of using the first and the second plane plates 130 and 131, each having transmittivity, combined as the optical axis correction unit 52. However, the present invention is not only limited to this, but also two lenses consisting of a flat convex lens and a flat concave lens combined (not shown in figure) and an acoustic optic modulator (not shown in figure), etc. can be used. Anyway, the present invention can be widely applied to devices if the device is capable of deviating the optical axis of the projection beam L1.

Moreover, the embodiments described above have dealt with the case of conducting the optical axis correcting operation in the image reproduction unit 50 when the movie film 1 stops running. However, the present invention is not only limited to this but the optical axis can be corrected while the movie film 1 is running using the position signal obtained at the time when the film stops running.

Furthermore, the embodiments described above have dealt with the case of conducting the position detection and optical axis correction every time the movie film 1 stops running in the image reproduction unit 50. However, the present invention is not only limited to this but also the optical axis can be corrected using an average signal of a plurality of stop position signals.

Furthermore, the embodiments described above have dealt with the case of correcting the optical axis of the projection light beam L1 at the real time by synchronizing the optical axis correction unit 52 with the operation timing of the intermittent forwarding sprocket 26 and the projection shutter 30. However, the present invention is not only limited to this but also a memory (not shown in figure) can be provided in the optical axis correction unit 52 and the position information in the running direction and the transverse direction of the movie film 1 may be written in the memory and then the optical axis of the projection light beam L1 may be corrected depending on the position information read out from the memory at the time when reproducing images.

Furthermore, the embodiments described above have dealt with the case of applying the image reproduction unit 50 to the movie film running device. However, the present invention is not only limited to this but it can be used in such as a telecine device (the device to convert images to be obtained from the movie film to TV use). In this case, the transmission light of the movie film 1 to be outputted from the image reproduction unit 50 is irradiated to a CCD camera connected to TV.

Furthermore, the embodiments described above have dealt with the case of reproducing images of the movie film 1 in the image reproduction unit 50. However, the present invention is not only limited to this but also it can be used to a movie film recording device to record images on the movie film 1 by irradiating the fixed image light to the fixed area of the movie film 1.

According to the present invention as described above, since in the first and the second guide units which hold the movie film from both sides and on which window holes to pass through the light source light or image light to the fixed area of the movie film are formed, multiple electrodes are provided facing the movie film edge including a plurality of perforations formed along the longitudinal direction of the movie film on the first guide unit, while the band shaped conducting material is arranged facing multiple electrodes having the movie film between in the second guide unit, and each stop position for the window hole is detected depending on the amount of change of each electrostatic capacity changing corresponding to the displacement rate from each stop position of multiple condensers formed making each electrode and conducting material as a pole plate respectively and the thickness of the movie film as the distance of pole plates, a film position detection device and a film image display device and a movie film recording device which are capable of improving the position detection accuracy of the movie film can be realized with the simple construction.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A film position detecting device for detecting the stop position of a movie film for each intermittent forwarding when a film running device is connected with a plurality of perforations formed on said movie film in the longitudinal direction to carry said movie film intermittently, comprising:

the first and second guide means for holding said movie film driven by said film running device from both sides and on which window holes for transmitting light source light or image light are formed;

the plural number of electrodes provided in said first guide means facing, at least, one of the edges of said movie film containing said perforations; and a band shaped conducting material provided in said second guide means facing said electrodes having said movie film between; and position detecting means for detecting the stop position of said movie film with respect to said window holes, based on the amount of change of each electrostatic capacity of a plurality of condensers which are formed making said electrodes and said band shaped conducting material as pole plates respectively and the thickness of said movie film as the distance of said pole plates, said amount of change of electrostatic capacity changing depending on the displacement rate of the stop position of said movie film for each intermittent forwarding.

2. The film position detecting device according to claim 1, wherein:

said electrodes provided in said first guide means are arranged as a pair of electrodes corresponding to two sides of the direction being at right angles to the running direction of said movie film out of four sides of the hole constituting said perforation; and said position detecting means detects the displacement rate of the stop position in the running direction of said movie film by said condensers which are formed with a pair of said electrodes and said band shaped conducting material.

3. The film position detecting device according to claim 2, wherein:

said electrodes provided in said first guide means are arranged further corresponding to the edge of said movie film; and said position detecting means detects the displacement rate of the stop position in the running direction of said movie film by said condensers which are formed with a pair of said electrodes and said band shaped conducting material and detects the displacement rate of the stop position in the direction being at right angles to the running direction of said movie film by a plurality of condensers which are formed with said electrodes arranged corresponding to the edge and said band shaped conducting material.

4. The film position detecting device according to claim 1, wherein:

said electrodes provided in said first guide means are arranged corresponding to the edge of said movie film; and said position detecting means detects the displacement rate of the stop position in the direction being at right angles to the running direction of said movie film by a plurality of condensers which are formed with said electrodes arranged corresponding to the edge and said band shaped conducting material.

5. The film position detecting device according to claim 1, wherein said first guide means has a face on which said multiple electrodes are provided smoothly formed in order not to produce friction on said movie film.

6. A film image display device for carrying a movie film intermittently by connecting a film running device with a plurality of perforations formed on said movie film in the longitudinal direction and for displaying the transmitted light of said movie film to a predetermined projection object by irradiating the light source light from the light source to the fixed area of said movie film at the stop position of said movie film for each intermittent forwarding, said film image displaying device comprising:

the first and second guide means for holding said movie film driven by said film running device from both sides and on which window holes for transmitting the light source light or the image light to the fixed area of said movie film are formed;

the plural number of electrodes provided in said first guide means facing, at least, one of the edges of said movie film containing said perforations;

a band shaped conducting material provided in said second guide means facing said electrodes having said movie film between;

position detecting means for detecting the stop position of said movie film with respect to said window holes, based on the amount of change of each electrostatic capacity of a plurality of condensers which are formed making said electrodes and said band shaped conducting material as pole plates respectively and the thickness of said movie film as the distance of said pole plates, said amount of change of electrostatic capacity changing depending on the displacement rate of the stop position of said movie film for each intermittent forwarding; and optical axis correcting means, which is provided on an optical axis of the transmitted light of said movie film, for correcting an optical axis of the transmitted light of said movie film in order to control the sway of image displayed on said projection object in accordance with the output of said position detecting means.

7. The film image displaying device according to claim 6, wherein:

said electrodes provided in said first guide means are arranged as a pair of electrodes corresponding to two sides of the direction being at right angles to the running direction of said movie film out of four sides of the hole constituting said perforation and are arranged further corresponding to the edge of said movie film; said position detecting means detects the displacement rate of the stop position in the running direction of said movie film by said condensers which are formed with a pair of said electrodes and said band shaped conducting material and detects the displacement rate of the stop position in the direction being at right angles to the running direction of said movie film by a plurality of condensers which are formed with said electrodes arranged corresponding to the edge and said band shaped conducting material; and said optical axis correcting means corrects an optical axis of the transmitted light of said movie film in order to control the sway in the latitudinal direction and the transverse direction of the image displayed on said predetermined projection object in accordance with the output of said position detecting means.

8. The film image display device according to claim 6, wherein:

said electrodes provided in said first guide means are arranged corresponding to the edge of said movie film; said position detecting means detects the displacement rate of the stop position in the direction being at right angles to the running direction of said movie film by a plurality of condensers which are formed with said electrodes arranged corresponding to the edge and said band shaped conducting material; and said optical axis correcting means corrects an optical axis of the transmitted light of said movie film in order to control the sway in the transverse direction of the image displayed on said predetermined projection object in accordance with the output of said position detecting means.

9. The film image display device according to claim 6, wherein
 said first guide means has a face on which said electrodes are provided smoothly finished in order not to produce friction on said movie film.

10. A movie film recording device for carrying a movie film intermittently by connecting a film running device with a plurality of perforations formed on said movie film in the longitudinal direction, and for recording images on said movie film based on a predetermined image light by irradiating said image light to the fixed area of said movie film at the stop position of said movie film for each intermittent forwarding, said movie film recording device comprising:
 the first and second guide means for holding said movie film driven by said film running device from both sides and on which window holes for transmitting the light source light or the image light to the fixed area of said movie film are formed;
 the plural number of electrodes provided in said first guide means facing, at least, one of the edges of said movie film containing said perforations;
 a band shaped conducting material provided in said second guide means facing said electrodes having said movie film between;
 position detecting means for detecting the stop position of said movie film with respect to said window holes, based on the amount of change of each electrostatic capacity of a plurality of condensers which are formed making said electrodes and said band shaped conducting material as pole plates respectively and the thickness of said movie film as the distance of said pole plates, said amount of change of electrostatic capacity changing depending on the displacement rate of the stop position of said movie film for each intermittent forwarding; and
 optical axis correcting means, which is provided on an optical axis of said predetermined image light, for correcting an optical axis of said image light in order to control the sway of image recorded on said movie film in accordance with the output of said position detecting means.

11. The movie film recording device according to claim 10, wherein:
 said electrodes provided in said first guide means are arranged as a pair of electrodes corresponding to two sides in the direction being at right angles to the running direction of said movie film out of four sides of the hole constituting said perforation and are arranged further corresponding to the edge of said movie film; said position detecting means detects the displacement rate of the stop position in the running direction of said movie film by said condensers which are formed with a pair of said electrodes and said band shaped conducting material and detects the displacement rate of the stop position in the direction being at right angles to the running direction of said movie film by a plurality of condensers which are formed with said electrodes arranged corresponding to the edge and said band shaped conducting material; and said optical axis correcting means corrects an optical axis of said image light to said movie film in order to control the sway in the latitudinal direction and the transverse direction of the image recorded on said movie film in accordance with the output of said position detecting means.

12. The movie film recording device according to claim 10, wherein:
 said electrodes provided in said first guide means are arranged corresponding to the edge of said movie film; said position detecting means detects the displacement rate of the stop position in the direction being at right angles to the running direction of said movie film by a plurality of condensers formed with said electrodes arranged corresponding to the edge and said band shaped conducting material; and said optical axis correcting means corrects an optical axis of said image light to said movie film in order to control the sway in the transverse direction of image recorded on said movie film in accordance with the output of said position detecting means.

13. The movie film recording device according to claim 10, wherein
 said first guide means has a face on which said electrodes are provided smoothly finished in order not to produce friction on said movie film.

* * * * *